UNITED STATES PATENT OFFICE

FRITZ LEIBBRANDT, OF FREIBURG, GERMANY

COPPER-ARSENIC COMPOUND OF PALMITIC ACID AND PROCESS OF PREPARING IT

No Drawing. Application filed June 16, 1930, Serial No. 461,631, and in Germany June 19, 1929.

The present invention relates to the copper-arsenic compound of palmitic acid and a process of preparing it.

For the purpose of plant-protection large quantities of copper-arsenic compounds are used, the most important of which being Schweinfurth green Paris green). The Schweinfurth green has certain drawbacks when used as insecticide and/or fungicide, because the leaves of the plants, especially of delicate kinds of plants, are often injured by corrosions due to the formation of soluble arsenious acid compounds or of free arsenious acid.

According to the present invention this drawback is remedied by preparing from compounds of the type of the Schweinfurth green $Cu(COOCH_3)_2.3Cu(AsO_2)_2$ by double chemical transformation, new more difficultly soluble chemical compounds, which have likewise a strong toxic action. Thus, for instance, a fine suspension of Schweinfurth green is treated with a soluble salt, for instance an alkaline salt of silicic acid, boric acid, palmitic acid, other higher fatty acids or cyclic acids. The quantity of the alkaline salt is so calculated that at best both acetic acid radicals of the Schweinfurth green molecule are exchanged, an excess having to be avoided, because otherwise also the arsenious acid components would be exchanged to a certain extent. The compounds which are the most insoluble and at the same time the best in plant physiology, are obtained by choosing the acid to be introduced in such a strength that it is weaker than the acetic acid, but stronger than the arsenious acid, which is the case with the saturated and unsaturated higher fatty acids. Schweinfurth green may also be transformed with a solution other than an aqueous one, for instance with an alcoholic solution, in suitable cases also with molten salts in the above-described manner.

The following example serves to illustrate the invention, but it is not intended to limit it thereto.

1 kilo of Schweinfurth green is suspended in 1 liter of water and then mixed with the solution of 500 grams of sodium palmitate in 3 liters of water, to which a small quantity of alcohol is preferably added. In order to accelerate the reaction, the whole is gently heated, whereupon the new compound separates after some time in the form of coarse flakes. It is very well extracted with water and then dried, stronger heating being avoided. The compound is green and very poisonous. It contains palmitic acid in the molecule.

It has the following probable formula $$Cu(C_{15}H_{31}COO)_2.3Cu(AsO_2)_2$$

I claim:

1. The process which comprises treating Schweinfurth green $$Cu(CH_3COO)_2.3Cu(AsO_2)_2$$

with the sodium salt of palmitic acid in an aqueous solution with addition of alcohol.

2. The process which comprises treating one mole of Schweinfurth green $$Cu(CH_3COO)_2.3Cu(AsO_2)_2$$

with two moles of the sodium salt of palmitic acid in an aqueous solution with addition of alcohol.

3. The compound of the following probable formula $Cu(C_{15}H_{31}COO)_2.3Cu(AsO_2)_2$ being green and very poisonous.

4. The process which comprises treating Schweinfurth green $$Cu(CH_3COO)_2.3Cu(AsO_2)_2$$

with an alkali-metal salt of palmitic acid in an aqueous solution.

In testimony whereof, I affix my signature.

FRITZ LEIBBRANDT.